No. 659,773. Patented Oct. 16, 1900.
I. F. TUCKER.
SUGAR BEET HARVESTER.
(Application filed Apr. 13, 1900.)
(No Model.)
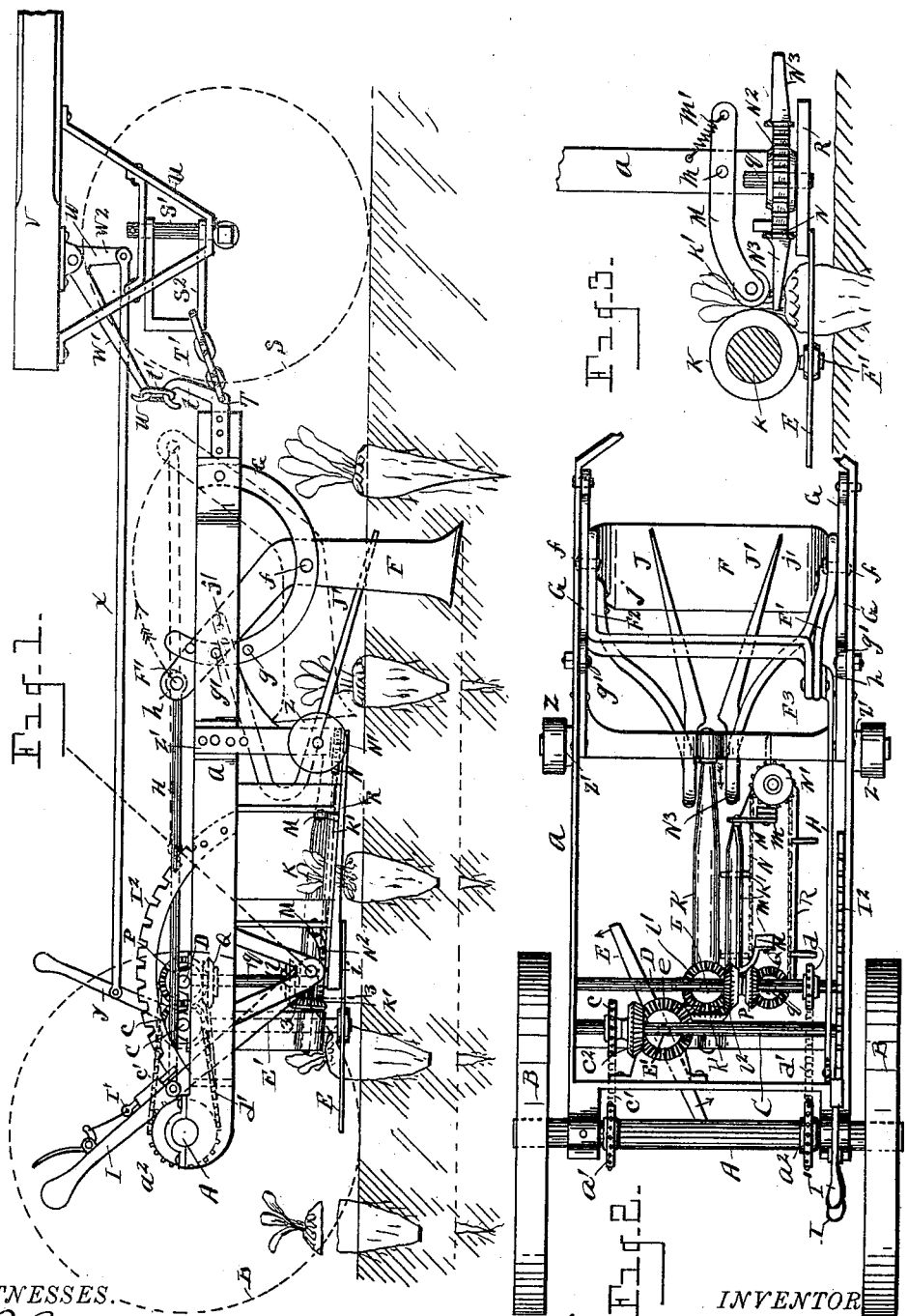

UNITED STATES PATENT OFFICE.

IRETT F. TUCKER, OF SUMNER, MICHIGAN, ASSIGNOR OF ONE-HALF TO EDWARD L. ALVORD, OF DETROIT, MICHIGAN.

SUGAR-BEET HARVESTER.

SPECIFICATION forming part of Letters Patent No. 659,773, dated October 16, 1900.

Application filed April 13, 1900. Serial No. 12,719. (No model.)

*To all whom it may concern:*

Be it known that I, IRETT F. TUCKER, a citizen of the United States, residing at Sumner, county of Gratiot, State of Michigan, have invented a certain new and useful Improvement in Sugar-Beet Harvesters; and I declare the following to be a full, clear, and exact description of the invention, such as will enable others skilled in the art to which it appertains to make and use the same, reference being had to the accompanying drawings, which form a part of this specification.

My invention has for its object a sugar-beet harvester; and it consists of the structure, combination, and arrangement of devices hereinafter described and claimed, and illustrated in the accompanying drawings, in which—

Figure 1 is a view of the machine in side elevation. Fig. 2 is a view of the same in plan. Fig. 3 is a partial view in rear elevation and vertical section on the line 3 3, Fig. 1.

The purpose of my invention is to provide a sugar-beet harvester of superior utility and efficiency whereby the beets may be partially lifted from the soil and the tops severed therefrom, the beets being left partially lifted from the ground and in condition where they may be readily gathered.

I carry out my invention as follows:

Any suitable frame is indicated at $a$. A is a rear axle journaled upon said frame, provided with wheels B B. The rear axle is provided with suitable driving-gear, two sprocket-gears being shown, (indicated at $a'$ and $a^2$.) Journaled in the frame is a shaft C, provided with a gear driven from the axle A. In the instance shown said shaft is provided with a sprocket-gear $c$, belted with the sprocket-gear $a'$ by a belt $c'$.

D indicates a transverse shaft journaled upon the frame, provided with a sprocket-wheel $d$, connected with the sprocket-wheels $a^2$, as by a chain $d'$.

E is a rotatable cutter driven from the shaft C, said cutter being engaged upon a rotatable shaft E', provided with a gear $e$, meshing with a gear $c^2$ upon the shaft C.

F is a cutter upturned at its extremities, the upturned extremities being pivotally supported or fulcrumed upon arcs G, as indicated at $f$, permitting said cutter to swing on said fulcrum on the arc of a circle when it is desired to raise and lower the same, the blade of the cutter extending transversely underneath the frame and from side to side thereof. The arcs G are made adjustable in the frame in any suitable manner. To this end one extremity of the arcs may be provided with a series of bolt-orifices, (indicated at $g$,) through which it may be bolted to the frame, as indicated at $g'$. In this manner the blade of the cutter may be tilted or lifted entirely from the ground, if desired, the lifted position being indicated in dotted lines in Fig. 1. To this end the upturned arms of the blade (indicated at F' F$^2$) may be united, as indicated at F$^3$, and an operating-rod H be connected therewith, as indicated at $h$, said rod being led backward to an operating-lever I, fulcrumed to a suitable portion of the frame, as indicated at $i$, and by which the cutter F may be oscillated. When it is desired to transport the machine or to turn it about at the ends of a row, the cutter may thus be readily lifted, while the cutting edge also may be tilted to any desired angle to cause the cutter to enter the sod. Normally the blade is inclined toward its cutting edge, as indicated in Fig. 1. The cutting-blade is preferably made thin, so as to pass readily through the soil at the desired depth. The rear edge of the blade being made a little higher than the front edge will lift the soil proportionately, and the beets may be severed at their lower ends by the cutter-blade, as indicated in Fig. 1. It is expected that the cutting edge of the cutter would sever the lower end of the beets, the soil thereabove being loosened at the same time, so that when the operation is complete the beets may readily be removed from the soil. The blade of the cutter extending transversely across the frame will have a cutting edge of sufficient length to pass under a row of beets and sever them at their lower ends and loosen the soil under and about the row.

Attached to the arms F' F$^2$ of the cutter are forks J and J', their forward ends diverging the one from the other. These forks J are led rearwardly at an upward inclination, as shown, and are then bent forward and engaged with said arms of the cutter in any suitable manner, as indicated, for example, at $j$ and $j'$. In this manner when the cutter is lifted or tilted the forks are lifted or tilted therewith. The forks are designed to straddle the tops of a row of beets and converging toward the rear thereof bring the tops of the row of beets together. To the rear of the forks are located a couple of rollers, (indicated at K and K'.) These rollers are preferably made of conical form at their front extremities, thereby providing a converging opening between the forward extremities, into which the tops of the beets are led from the converging forks already described. One of said rollers, as the roller K, may be driven by any suitable mechanism, while the other roller may simply be driven by friction. To this end the shaft $k$ of the roller K may be provided with a gear $k'$, meshing with a gear $l$ upon a shaft L, provided with a gear $l'$, meshing with a gear $l^2$ upon the shaft D. The shaft of the roller K may be journaled in the frame in any suitable manner, as also the shaft of the roller K'. I prefer, however, to journal the shaft of the roller K' upon oscillatory arms M, said arms having a fulcrumed engagement upon a suitable bracket or other portion of the frame, as indicated at $m$, spring $m'$ restoring said arms M to normal position.

N is a sprocket-chain passing over sprocket-wheels N' and $N^2$, said sprocket-wheels being journaled in suitable portions of the frame $a$. The sprocket mechanism may be actuated in any suitable manner. For example, the shaft D may be provided with a gear P, meshing with a gear Q upon a shaft $q$, carrying the sprocket-wheel $N^2$. The sprocket-chain N is provided with a series of arms $N^3$. The shafts of the sprocket-wheels are journaled in a plate R, which extends underneath the chain. The plate R forms a support against which the beets may be held in the operation of the knife E to sever the tops thereof.

At the front of the frame $a$ are wheels S, the axle of which is provided with an upwardly-projecting bolt S', turning with the axle. Upon said bolt is a clevis or similar device $S^2$, swinging with the bolt S', said clevis being connected to a draw-bar or coupling T to engage upon the frame $a$, as by a chain T', the connection of the clevis with the draw-bar being a flexible connection. Upon the axle of the wheels S are secured brackets U, supporting a tongue V. To the under side of the tongue is fulcrumed a bell-crank lever W, one arm W' of which is connected with the draw-bar T, said draw-bar being preferably constructed with a hook $t$ and the arm W' with a hook $w$, the two hooks being united by a link $t'$. With the opposite arm $W^2$ of the bell-crank is connected an operating-rod fulcrumed to an operating-lever Y. By means of said lever Y and the bell-crank W, connected with the draw-bar T, it is evident that the forward ends of the frame may be raised or lowered, as may be desired.

The lever I is provided with pawl mechanism I' to engage a rack-bar $I^2$.

The operation of the mechanism above described is as follows: The cutter F is adjusted to enter the soil a desired depth. As the machine advances, the beets are cut off in the ground toward their lower ends and slightly lifted by the inclination of the blade of the cutter, as hereinbefore described. The forks J J' direct the tops of the beets toward the forward ends of the rollers K K', the tops being guided in between said rollers. To prevent the tops of the beets being drawn forward as the tops are caught by the rollers K K' and being at once pulled out of the ground, the sprocket-chain N is provided with arms $N^3$. Said chain revolves under the roller K' in the direction indicated by the arrow. It will be evident that as the machine itself is advancing this movement of the sprocket-chain will force the arms $N^3$ in front of the tops of the beets, causing the tops to be engaged between the rolls. These rolls, as will be seen in Fig. 1, are inclined upward toward their rear ends. As the tops of the beets are engaged between the rolls and are carried back therebetween the beets will be gradually lifted, corresponding to the incline of the rollers, until the tops have been carried back to the rear extremities of the rolls, at which point the rotary cutter E severs the tops from the beets, letting the beets stand out of the ground a desired distance, the ground, as already described, being loosened about the beets by the cutter and the lower end of the beets being severed, so that the beets after being cut at both ends may readily be removed. The flexible connection T' of the frame with the front wheels S allows the frame to swing laterally as may be desired.

Between the forward and rear ends of the frame the frame is preferably provided with trucks (indicated at Z) to support the forward end of the frame at a desired height, the said trucks having an adjustable engagement with the frame, as upon supporting-brackets, (indicated at Z',) which may be provided with a series of perforations, whereby the trucks Z may be adjusted to any desired height. In case the front wheels S should drop into a hole, as into a dead furrow, the trucks Z will prevent the forward ends of the rollers plunging into the ground.

What I claim as my invention is—

1. In a beet-harvester, the combination with a supporting-frame, of a cutter to enter the soil and cut the roots extending transversely from side to side of the frame, means to swing said cutter upward and downward on the arc of a circle, and means to the rear of said cutter to sever the tops of the beets.

2. In a beet-harvester, the combination with a frame, of a cutter to enter the soil and cut the roots extending transversely from side to side of the frame, means to swing said cutter upward and downward, converging forks movable with said cutter, and means to the rear of said cutter to sever the tops of the beets.

3. In a beet-harvester, the combination with a frame, of a cutter to enter the soil and cut the roots extending transversely from side to side of the frame, means to swing said cutter upward and downward, and means to the rear of said cutter to sever the tops of the beets, said cutter being vertically adjustable.

4. In a beet-harvester, the combination with a frame, of a cutter to enter the soil and cut the roots, said cutter provided with upwardly-projecting arms, means connected with said arms to swing said cutter upward and downward, and means to the rear of said cutter to sever the tops of the beets.

5. In a beet-harvester, the combination with a frame, of a cutter, rotatable rollers to the rear of the cutter, and converging forks to direct the tops of the beets between said rolls.

6. In a beet-harvester, the combination with a frame, of a cutter, rotatable rolls, means to direct the tops of the beets between said rolls and means to prevent the tops of the beets being drawn forward as the rolls advance.

7. In a beet-harvester, the combination with a frame, of a cutter, rolls to engage the tops of the beets therebetween, and a sprocket-chain rotatable adjacent to said rolls, said chain provided with projecting arms.

8. In a beet-harvester, the combination with a cutter, rotatable rolls to the rear of the cutter inclined upward toward their rear extremities, and an additional cutter adjacent to the rear extremities of said rolls.

9. In a beet-harvester, the combination with a frame, of a cutter to enter the soil, rotatable rolls to the rear of said cutter arranged to engage and lift the tops of the beets, a rotatable cutter toward the rear extremities of said rolls, means to prevent the tops of the beets being drawn forward when engaged by the rolls, and means to rotate one of said rolls.

10. In a beet-harvester, the combination with a frame, of a cutter to sever the beets in the ground, means to partially lift the beets out of the ground, and mechanism to sever the tops of the beets when the beets are partially lifted from the ground.

11. In a beet-harvester, the combination with a frame, trucks to support the forward end of the frame, wheels at the front of the frame having a flexible connection therewith, wheels supporting the rear end of the frame, a cutter to enter the soil having an oscillatory engagement with the frame, mechanism to grasp the tops of the beets and lift the beets partially from the ground, mechanism to sever the tops of the beets when lifted from the ground, and means driven from the axle of the rear wheels to operate said mechanisms.

12. In a beet-harvester, the combination with a frame, a transverse cutter to enter the soil, rotatable rolls to the rear of the cutter to grasp the tops of the beets and lift the beets partially from the soil, means to direct the tops of the beets between said rolls, and means to sever the tops of the beets when partially lifted from the soil.

13. In a beet-harvester, the combination with a frame, of a cutter extending transversely from side to side of the frame to enter the soil, and provided with an inclined blade having a forward cutting edge, means to remove said cutter from the soil, and an additional cutter to sever the tops of the beets.

14. In a beet-harvester, the combination with a cutter to enter the soil, of rotatable rolls to engage the tops of the beets, said rolls inclined upward toward their rear ends, and an additional cutter to sever the tops of the beets.

15. In a beet-harvester, the combination with a frame provided with a cutter extending transversely from side to side of the frame to enter the soil, of the rotatable rolls to the rear of said cutter to engage the tops of the beets, said rolls inclined upward toward their rear ends, and means to direct the tops of the beets between said rolls.

In testimony whereof I sign this specification in the presence of two witnesses.

IRETT F. TUCKER.

Witnesses:
N. S. WRIGHT,
M. HICKEY.